Nov. 17, 1942.                B. E. LUBOSHEZ                2,302,621
                                SCREW STICK
                              Filed July 8, 1942
FIG.1.           FIG.3.            FIG.5.            FIG.7.
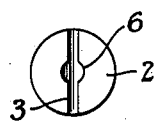  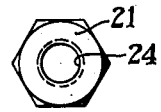 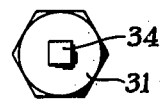
FIG.2.           FIG.4.            FIG.6.            FIG.8.
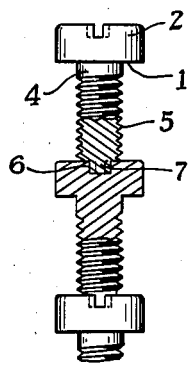 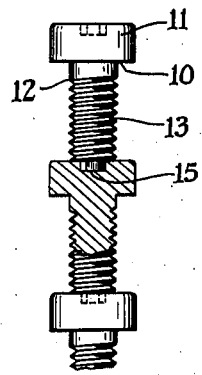 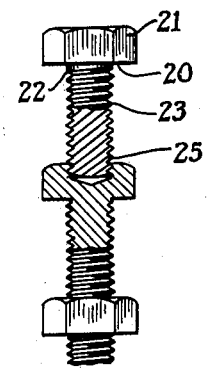 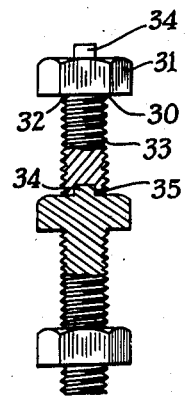
FIG.9.                             FIG.14.           FIG.16.
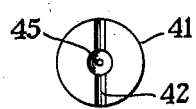   FIG.12.     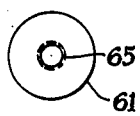 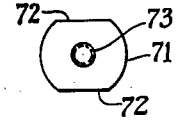
FIG.10.          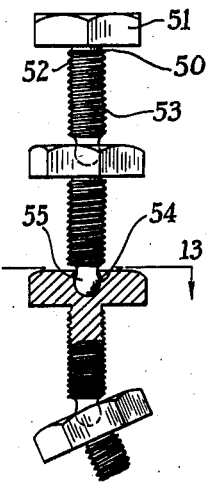  FIG.15.           FIG.17.
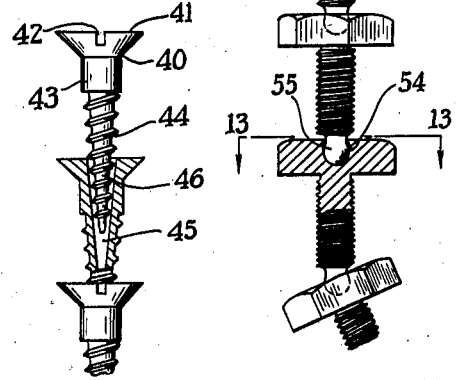                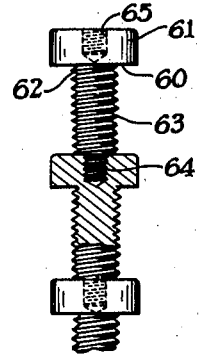 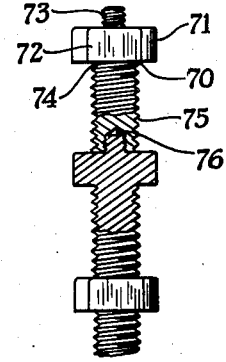
FIG.11.
                                  BENJAMIN E. LUBOSHEZ
                                       INVENTOR
                                  BY
                                       ATTORNEYS Patented Nov. 17, 1942

2,302,621

UNITED STATES PATENT OFFICE 2,302,621

SCREW STICK

Benjamin E. Luboshez, Rochester, N. Y.

Application July 8, 1942, Serial No. 450,097

5 Claims. (Cl. 85—41)

This invention relates to a screw stick for use in screw driving machines and to a method of making such a screw stick. One object of my invention is to provide a stick of individual screws which may be temporarily joined together for use in screw driving machines and which may be separated as one screw at a time is driven into work. Another object of my invention is to provide a method of forming such screw sticks. Other objects will appear from the following specification, the novel features being particularly pointed out in the claims at the end thereof.

In the past, manually operated and automatically operated screw driving machines have ordinarily been made to take separate or unconnected screws which had to be loaded into some form of hopper from which they were carried through tubular or other guides into a position to be driven into work. Such machines are usually comparatively complicated, are not particularly portable, and the screw feeding mechanism is liable to cause considerable trouble.

There has recently been suggested screw sticks made from one piece of metal, these screw sticks having narrow necks which are twisted off after an end screw has been driven into work. Such screw sticks, particularly when in the form of small screws, have proved very useful, but for some types of screws—particularly large ones— it is thought that individual screws which can be assembled into a stick would have certain advantages, particularly from the manufacturing standpoint. Such built-up screw sticks could be used in comparatively simple types of screw driving mechanisms and would also have many of the advantages of an integral screw stick with some advantages which are not present in this type of screw stick.

In the drawing wherein like reference characters denote like parts throughout:

Fig. 1 is a top plan view of a screwhead of one of a plurality of screws which may be formed into a screw stick and embodying one form of my invention;

Fig. 2 is a part section and part side elevation of a portion of a screw stick built up from a plurality of screws;

Fig. 3 is a top plan view of a screwhead constructed in accordance with another embodiment of my invention;

Fig. 4 is a part section and part side elevation of a screw stick built up with screws having heads as shown in Fig. 3;

Fig. 5 is a top plan view of a screw having still another type head illustrating another embodiment of my invention;

Fig. 6 is a part side elevation and part section showing a portion of a screw stick built up of screws with heads as shown in Fig. 5;

Fig. 7 is a top plan view of another type of screwhead constructed in accordance with my invention;

Fig. 8 is a part section and part side elevation of a portion of a screw stick built up with screws having heads as shown in Fig. 7;

Fig. 9 is a top plan view of a screwhead constructed in accordance with another ambodiment of my invention;

Fig. 10 is a part side elevation and part section of a screw stick built up from screws having heads as shown in Fig. 9;

Fig. 11 is a top plan view of a modification of the screws shown in Figs. 9 and 10;

Fig. 12 is a part side elevation and part section of a flexible type of screw stick illustrating another embodiment of my invention;

Fig. 14 is a top plan view of a screwhead constructed in accordance with another embodiment of my invention;

Fig. 15 is a part section and part elevation of a portion of a screw stick built up from screws having heads as shown in Fig. 14.

Fig. 16 is a top plan view of a screwhead embodying still another form of my invention, and Fig. 17 is a part section and part side elevation of a portion of a screw stick built up from screws having heads of the type shown in Fig. 16.

Figure 13:
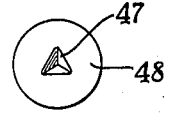
Fig. 13 is an enlarged detail sectional view showing a portion of a ball and socket connection between a screw shank and screwhead in a screw stick of the type shown in Fig. 12.

My invention comprises broadly a screw stick which may be built up from any number of individual units in which the screws may be of normal types except for the fact that each screw is provided on the head and on the end of the shank with complemental-shaped formings so that the shank end of one screw may be temporarily attached to the head end of the next adjacent screw and a series or plurality of screws may be provided of any required length to go into screw driving machines, such as portable, manually operated machines, power operated machines, or the more complicated types of bench machines, which usually operate in a fixed position. Since the screw driving machines form no part of the present invention, they need not be described herein and are only mentioned to bring out the reason why screw sticks or rods, such as will be hereinafter described, are desirable and even necessary.

My invention also consists in a method of assembling individual screws into a stick in which the individual screws are temporarily held together to facilitate their use in screw driving machines.

Referring to Figs. 1 and 2, a typical example of my invention is shown as comprising a screw broadly designated as 1, having a screwhead 2, which may be provided with the usual slot 3. The screw likewise has a shank 4 having a threaded portion 5. As thus far described, the screw may be of a normal type. However, the screw differs from the normal type screw in that the head 2 and the end of the shank 4 are provided with complemental-shaped parts—in this case a round aperture 6 in the screwhead 2 and a round plug 7 on the end of the shank. The aperture and plug are of a size which may be frictionally fitted together by applying pressure axially of the screw so that a plurality of screws 1 may be temporarily held together in rod form for use in a screw driving machine. Such a machine may drive the end screw into work, after which the next adjacent screw can be dislodged or removed from the driven screw by means of an upward pull on the driving machine.

A second embodiment of my invention is shown in Fig. 3, wherein the screw designated broadly as 10 may have a known type of head 11 and shank 12 threaded at 13. In this form of my invention I prefer to form the head with a hexagonal aperture 14 in which a complemental-shaped hexagonal plug 15 may fit frictionally as before.

In Figs. 5 and 6 a third embodiment of my invention is shown in which the screw 20 includes a screwhead 21 and a shank 22 which may be threaded at 23. In this form the screwhead 21 is provided with a threaded aperture 24 having threads adapted to receive the end 25 of the threaded shank 23 so that in this instance the end 25 and the socket 24 constitute the complemental-shaped parts which may be frictionally engaged to hold the screws assembled in a stick. The female thread may be formed by swaging the metal at several points as in Fig. 13.

Figs. 7 and 8 show a form of my invention much like Figs. 3 and 4, except that the position of the complemental-shaped parts is reversed. In this form the screw 30 has the usual head 31 and shank 32 threaded at 33. The complemental formings are constituted by a square plug 34 projecting upwardly from the head 31 and a square aperture 35 formed in the base of the threaded shank 33. Such a screw can readily be used where it is desirable to seat the end of the thread 33 in a tapped opening and where a projection on the end of the shank would be undesirable.

My invention can also be applied to wood screws, as indicated in Figs. 9 to 10 inclusive. In Fig. 10 the wood screw 40 may be provided with the usual head 41 and slot 42, there being a shank 43 threaded at 44 in the usual manner. These screws, however, differ from the standard wood screws in that the head 41 is provided with a hollow portion 45 which, as best shown in Fig. 10, is tapering in shape and which is complemental in shape to the end 46 of the threaded shank 44. Thus, the threaded shank may fit into the complemental-shaped opening 45 and a series of these screws may be mounted into stick form by the frictional fit between the threaded end 46 and the tapered opening 45.

If desired, instead of having the opening 45 round in cross-section, it may be provided with a triangular opening 47 as shown in the screwhead 48 shown in Fig. 11. The screw thread 44 will frictionally fit into this triangular opening which may be considered as complemental in shape to the shape of the end 46 of the screw threads although actually it is not truly of a complemental shape.

It is sometimes desirable to provide a stick of screws or bolts which can move through a curved path and which may still be temporarily held together. In Figs. 12 and 13 I have illustrated a typical example of such an embodiment of my invention. In this form a screw 50 may be provided with a head 51 and shank 52 which is threaded at 53. The temporary fastening devices in this instance are formed by a socket 54 in the screwhead 51 which receives a ball-like forming 55 on the end of the screw shank 52. When a series of these screws are fastened together, as indicated in Fig. 12, the balls 55 and sockets 54 form a joint which permits considerable movement of one bolt relative to the next, as indicated in the last bolt shown at the bottom of Fig. 12.

This connection between the separate bolts can be readily made since the bolts may be assembled by placing the ball 55 in the socket 54 and swaging the metal in at two or more places 56, as indicated in Fig. 13. Thus, while the ball is held sufficiently for the rod or chain of bolts to be handled and loaded into bolt applying machines, the ball can nevertheless be dislodged by a sharp pull separating the driven screw from the remaining screws in the chain.

In certain forms of my invention, such as those shown from Figs. 10 to 13 inclusive, it might be noted that the interfitting parts on the shanks and heads of the bolts or screws are not exactly complemental in shape. However, they are substantially complemental in that they fit into each other and frictionally engage to such an extent that the bolts may be held together during the handling and loading operation and can be removed from each other after an end screw is driven into work. In the present specification and claims I intend the term "complemental in shape" to include such forms as indicated in Figs. 11 and 12, for instance, in which the parts are really not exactly complemental, since they may have somewhat different contours.

In Figs. 14 and 15 the screw 60 may have the head 61 and a shank 62 threaded at 63. In this form of my invention the complemental-shaped fastening devices may be a threaded extension 64 on the end of the shank which is adapted to enter a threaded socket 65 in the head of the screws. As indicated in this figure, the threads of the extension 64 are different from the threads of the main shank 63. Such screws can only be used where the end of the shank does not seat itself on the bottom of a tapped aperture. However, if it is necessary to seat the screw, the form of my invention, shown in Figs. 16 and 17, can be employed. As here shown the screw 70 may include a head 71 having flats 72 on each side, there being an upwardly extending threaded rod 73 carried by the head. The shank 74 may be threaded at 75 and includes a tapped opening 76 complemental in shape to the threaded rod 73. Thus, these screws may be assembled by mating the threaded areas 73 and 76.

In all of the forms of my invention illustrated in the drawings and described above, each individual screw may be separately manufactured or constructed of single or multiple units and may be assembled by machinery if desired or by hand by placing a complemental-shaped fastening member of one screw-head in frictional engagement with a complemental-shaped fastening member on the shank end of the screw. This frictional fit may be a so-called press fit in the forms of the invention shown in Figs. 1 to 4 inclusive and 9 to 11 inclusive. The frictional fit may be a loose fit which permits movement of one screw relative to the other, as in the embodiment shown in Figs. 12 and 13, wherein a form of ball and socket joint is provided, the metal of the socket being frictionally engaged with the metal of the ball by swaging or by any other suitable method. In all of the forms of my invention I have provided a method of forming screw rods or sticks from a plurality of identical screws which differ from the standard screws primarily in that each screw is provided with complemental members at opposite ends which may be used for assembling a plurality of screws so that they can be handled as a single unit and so that after an end screw has been applied to work the remaining screws may be disconnected from the screw applied to work either by pulling the next adjacent screw away from it or by unscrewing the complemental parts or otherwise.

In the specification and claims the term "screwhead" is intended to refer broadly to that end of the screw opposite to the threaded area by which the screw is usually driven into work, whether or not the head is of greater cross-sectional dimension than the threaded area thereof. Obviously heads of various sizes and dimensions may be used.

What I claim as new and desire to secure by Letters Patent of the United States is:

1. A stick of screws for use in a screw driving machine comprising a plurality of screws, each screw including a head, a shank and thread on the shank, complemental formings on the head and shank of each screw, the forming on the head of one screw engaging the forming on the shank of the next adjacent screw holding the screws together.

2. A stick of screws for use in a screw driving machine comprising a plurality of screws, each screw including a head, a shank and thread on the shank axially positioned and complementally-shaped formings carried by the head and shank of each screw, the forming carried by the head of one screw frictionally engaging the forming carried by the shank of the next adjacent screw thereby holding the plurality of screws in stick form.

3. A stick of screws for use in a screw driving machine comprising a plurality of screws, each screw including a head, a shank and thread on the shank axially positioned and complementally-shaped threaded formings carried by the head and shank of each screw, the threaded forming carried by one screwhead being screwed into the threaded forming carried by the shank of the next adjacent screw whereby a plurality of screws may be held screwed together in stick form by said complemental formings.

4. A stick of screws comprising a plurality of individually formed screws each including a head, a shank carried thereby, joining elements of complemental shape formed on the head and shank for temporary engagement to hold the head of one screw affixed to the shank of the next adjacent screw, said complemental joining elements being of a form to facilitate separation of the parts after an end screw has been applied to work.

5. A stick of screws for use in a screw driving machine comprising a plurality of screws, each screw including a head, a shank and thread on the shank axially positioned and complementally-shaped formings carried by the head and shank of each screw, said formings being of semi-spherical shape and forming a ball-and-socket joint between the head of one screw and the shank of another screw whereby the individual screws of said screw stick may be flexibly connected together.

BENJAMIN E. LUBOSHEZ.